350-96.1

SR

XR 3,746,870

SEARCH ROOM

United State

Demarest

SUBSTITUTE FOR MISSING XR

[11] 3,746,870

[45] July 17, 1973

[54] COATED LIGHT CONDUIT

[75] Inventor: Donald M. Demarest, Wallingford, Pa.

[73] Assignee: General Electric Company, Philadelphia, Pa.

[22] Filed: Dec. 21, 1970

[21] Appl. No.: 99,892

[52] U.S. Cl. .................................. 250/227, 324/96

[51] Int. Cl. ........................ G01r 31/00, G02b 5/14

[58] Field of Search.......................... 250/217 S, 227; 324/96; 252/519

[56] References Cited

UNITED STATES PATENTS

| | | | |
|---|---|---|---|
| 2,409,514 | 10/1946 | Pratt | 252/519 X |
| 3,541,341 | 11/1970 | Leete | 250/227 |
| 3,244,894 | 4/1966 | Steele et al. | 250/227 |
| 3,485,940 | 12/1969 | Perry et al. | 324/96 |

*Primary Examiner*—James W. Lawrence
*Assistant Examiner*—T. N. Grigsby
*Attorney*—J. Wesley Haubner, Albert S. Richardson, Frank L. Neuhauser, Oscar B. Waddell and Joseph B. Forman

[57] ABSTRACT

A coating having uniform resistive properties is applied to the surface of a light-transmitting fiber or conduit which is supported by the wall of an insulating enclosure between regions of substantially different potentials. The same coating also covers the exterior surface of the supporting wall. Electrical discharge along the conduit surface, resulting from the breaking down of surface resistivity between localized areas of differing potential, is prevented by the presence of the coating which provides a resistive surface while allowing charge mobility sufficient to neutralize adjacent areas of differing potential.

1 Claim, 3 Drawing Figures

Patented July 17, 1973

3,746,870

2 Sheets-Sheet 1

INVENTOR:
DONALD M. DEMAREST,
BY Albert S. Richardson Jr.
ATTORNEY

Patented July 17, 1973 3,746,870

2 Sheets-Sheet 2

INVENTOR:
DONALD M. DEMAREST,
BY Albert S. Richardson Jr.
ATTORNEY

COATED LIGHT CONDUIT

BACKGROUND OF THE INVENTION

The present invention relates generally to light-transmitting fibers or conduits, and more particularly it relates to such conduits which are useful to transmit light signals between two physically spaced-apart regions at significantly different electric potentials.

It is sometimes desirable to provide a communication link between areas or regions of greatly different electric potentials, which link maintains electrical isolation between such regions. One example of such a situation is found in high-voltage solid-state electric valves wherein gate pulse forming circuits at very high potentials are activated by remotely located control means whose potential is much lower One means for providing a communication link is known as a light guide or pipe which usually comprises a plurality of parallel optical fibers or light conduits inside a flexible, opaque jacket. Such light pipes may be used to transmit light pulses, which are generated, on command, by a source of light at ground potential, to a plurality of gating current signal deriving circuits respectively associated with a plurality of thyristors which are serially interconnected to form a high-voltage valve, as disclosed in U.S. Pat. No. 3,355,600-Mapham, assigned to the General Electric Company.

The light transmittance of an optical fiber depends upon the phenomenon of internal reflection, whereby light impinging from within the fiber upon the interface between a transparent cylindrical "core" having a higher index of refraction than a transparent cladding disposed about the core, and at grazing angles smaller than the critical angle for the fiber materials, is reflected along the length of the fiber. The term "light" is used herein in a general categorical manner to denote radiant energy, and it is intended to comprehend invisible as well as visible radiation. For example, ultra violet and infrared radiation are intended to be included within this term.

Although a variety of light guides are known and commercially available in the trade, heretofore none has been entirely satisfactory for very high voltage apparatus of the kind presently contemplated. In such applications there is a premium on long life and reliability, yet the light guide is subjected to a relatively harsh environment. The high voltage drop between its opposite ends and the moisture and other deleterious chemicals that may be present in the ambient atmosphere tend to degrade or to impair the light transmitting properties of the guide and to accelerate its aging.

It is therefore a general object of my invention to provide an improved light guide which will sustain a substantial voltage differential between its ends without experiencing a deterioration of its light-transmitting characteristics.

SUMMARY OF THE INVENTION

Briefly, according to one embodiment of my invention, one end of a light conduit or guide is placed in contact with a structure maintained at a relatively low voltage, and the opposite end is placed in contact with a structure maintained at a much higher voltage. A coating having substantially homogeneous resistive characteristics is disposed on the conduit surface and extended to the surfaces of the structures to which the extremities of the conduit are fastened. The whole conduit is thus an integral part of both structures. The coating, having a higher and more uniform conductivity than the original surface of the light conduit, permits a more uniform voltage gradient to exist thereupon with the result that deterioration of the light conduit is greatly reduced.

BRIEF DESCRIPTION OF THE DRAWINGS

The invention will be better understood and its various objects and advantages will be more fully appreciated from the following description taken inconjunction with the accompanying drawings in which.

DESCRIPTION OF ONE EMBODIMENT

Figure 1:
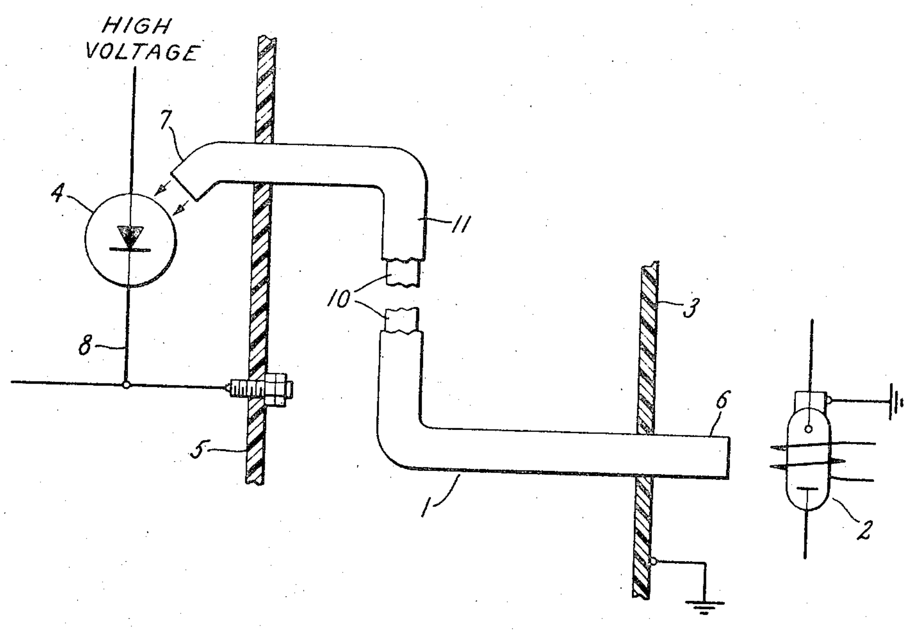
FIG. 1 is a diagrammatical representation of a light transmission system comprising a source of light, a light sensitive element, and a light pipe connected therebetween.

Referring now to FIG. 1, a light transmission path is provided by an electromagnetic wave guide 1 (hereinafter "light pipe") extending from a source of light 2, which is behind an enclosure 3, to a light sensitive element 4 located within an insulated enclosure 5. The enclosures 3 and 5 may be physically separate and distinct from each other, or alternatively they may comprise remote parts of a common housing. The purpose of the light pipe 1 is to transmit light signals an appreciable distance from the source 2 to the element 4. The source 2 comprises a gallium arsenide light emitting diode or a Xenon flash lamp or the like, and when activated by a suitable control signal it will emit light which enters the adjoining end 6 of the pipe 1. This light exits from the opposite end 7 of the pipe where it illuminates the element 4. The element 4 comprises a photodetector or a light-activated SCR or the like, and when the light from the pipe 1 impinges thereon it will abruptly switch from a normally high-resistance blocking state to a low-resistance current-conducting state, thereby controlling conduction by an electric circuit 8 in which the element 4 is connected.

Although not shown in FIG. 1 the input and output ends of the light pipe 1 can be terminated by connector plugs and mating receptacles such as those disclosed and claimed in U.S. Pat. No. 3,541,341 granted to B.D. Leete on Nov. 17, 1970, and assigned to the assignee of the present invention. In this manner the ends 6 and 7 of the light pipe 1 are fastened in intimate physical relationship to the enclosures 3 and 5, respectively. Typically the light source 2 and its enclosure 3 are maintained at or near ground potential, and the circuit 8 in which the light-activated element 4 is connected can have an electrical potential substantially different than ground (e.g., plus or minus at least 5,000 volts). Such a condition exists where the element 4 is part of the gating or power circuit of a high-voltage solid-state electric valve comprising a plurality of parallel arrays of thyristors in series. Actually in this particular setting a plurality of light-activated elements can be disposed at various potentials with respect to the common light source, and some of the near by elements may have potentials relatively close to that of this source. The light source 2 itself, instead of being grounded as shown, may alternatively be at a significantly elevated potential. In any event, it is assumed herein that due to the potential difference between the illustrated circuit 8 and the enclosure 3, a substantial potential difference can be established across the light pipe 1 which is interposed between regions respectively adjacent the source 2 and the element 4. The light pipe may extend for a distance of the order of 30 feet or more, and it is physically connected to the enclosure 5.

The illustrated light pipe 1 comprises one or more optical fibers 9. A plurality of these optical fibers are bundled randomly in an opaque polyethelene sheath or jacket 10 to form the light pipe. The term "optic" as used herein is not intended to imply only visible light. Optical fibers for either visible or invisible light are well known in the art and may be made of glass or suitable plastic. Each fiber comprises a transparent inner member or core clad with a transparent material of lower refractive index than the core material so that light travels in a zig-zag path through the core of each fiber by internal reflections from the cladding. The amount of light transmitted through the pipe 1 is a function of the number and the core area of constituent fibers, the intensity of the light source, and the loss characteristics of the light pipe. Typical diameters of individual fibers 9 are 1.5 to 2.5 mils, and the bundle may have a diameter of approximately 125 mils, for example.

Light pipes are normally made of materials having high resistance properties, whereby current leakage between regions of differing potential is minor. Nevertheless, in the contemplated high-voltage application the performance of an initially satisfactory light pipe may in time become unsatisfactory due to certain deteriorating effects which can result in loss of ability to withstand a large potential gradient or loss of light-transmitting qualities or both. This problem becomes acute when the light pipe is exposed to a damp or humid atmosphere.

I believe that the root cause of deterioration of such conduits, when they are called on to support a large potential difference, is localized concentrations of the electric potential to which the light pipe is subjected. This may be the result of irregular resistive qualities of the light pipe and its support materials, and/or it may result from the existence of high localized field gradients in certain areas traversed by the pipe. In either case, a critically high voltage may be imposed on a relatively small, local region of the light pipe. Even in an ideal environment, a corona discharge, accompanied by occasional arcing or "sparking," can occur at some point along the surface of the light pipe if the potential gradient at that point exceeds a value of approximately 30 volts per mil. The adverse effect of this phenomenon is accentuated by humidity and other undesirable conditions which may be encountered in practice. In the case of a glass optical fiber, a deterioration in the optical qualities of the fiber is likely to result from electrical discharge in the presence of moisture. In some types of glass it has been found that sodium atoms that are ionized by the discharge go into solution and migrate toward areas of opposite potential. This changes the physical properties of portions of the surface of the fiber, which results in regional embrittlement. Chipping or cracking of the cladding soon occurs, causing voids in the interface between the core and the cladding and consequently causing the optical transmissive qualities of the conduit to deteriorate.

If plastic were used for the optical fiber, heat released by electrical sparking on the conduit exterior, along with the presence of a high potential gradient, could attenuate and eventually destroy the optical transmissive qualities of the fiber.

In accordance with my invention, these undesirable effects are reduced by applying on the outer jacket of the light pipe a conductive coating material 11 tending to create a more even voltage distribution. The coating 11 adheres well to the surfaces of the light pipe and the insulating materials forming the enclosures, and it has a substantially homogeneous surface resistivity which can be approximately $10^8$ ohms per square, for example. One such material is a modified Krylon conductive paint, manufactured by Krylon, Incorporated, Norristown, Pa. The resistivity of this material is normally approximately $10^{11}$ ohms per square, which is within the acceptable range. Its effectiveness can be enhanced by the use of conducting additives, such as finely powdered iron oxide, to cause the resistivity to decrease to approximately $10^8$ ohms per square. As is illustrated in FIG. 1, the coating 11 completely surrounds the jacket 10 of the light pipe 1 along its full length between opposite ends 6 and 7.

DESCRIPTION OF ANOTHER EMBODIMENT

Figure 3:
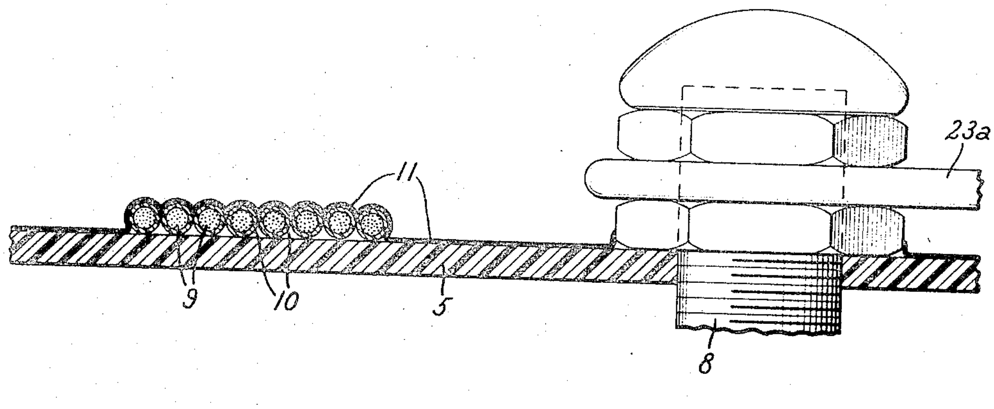
FIG. 3 is a sectional view of the light pipes taken along lines 3—3 of FIG. 2.
Figure 2:
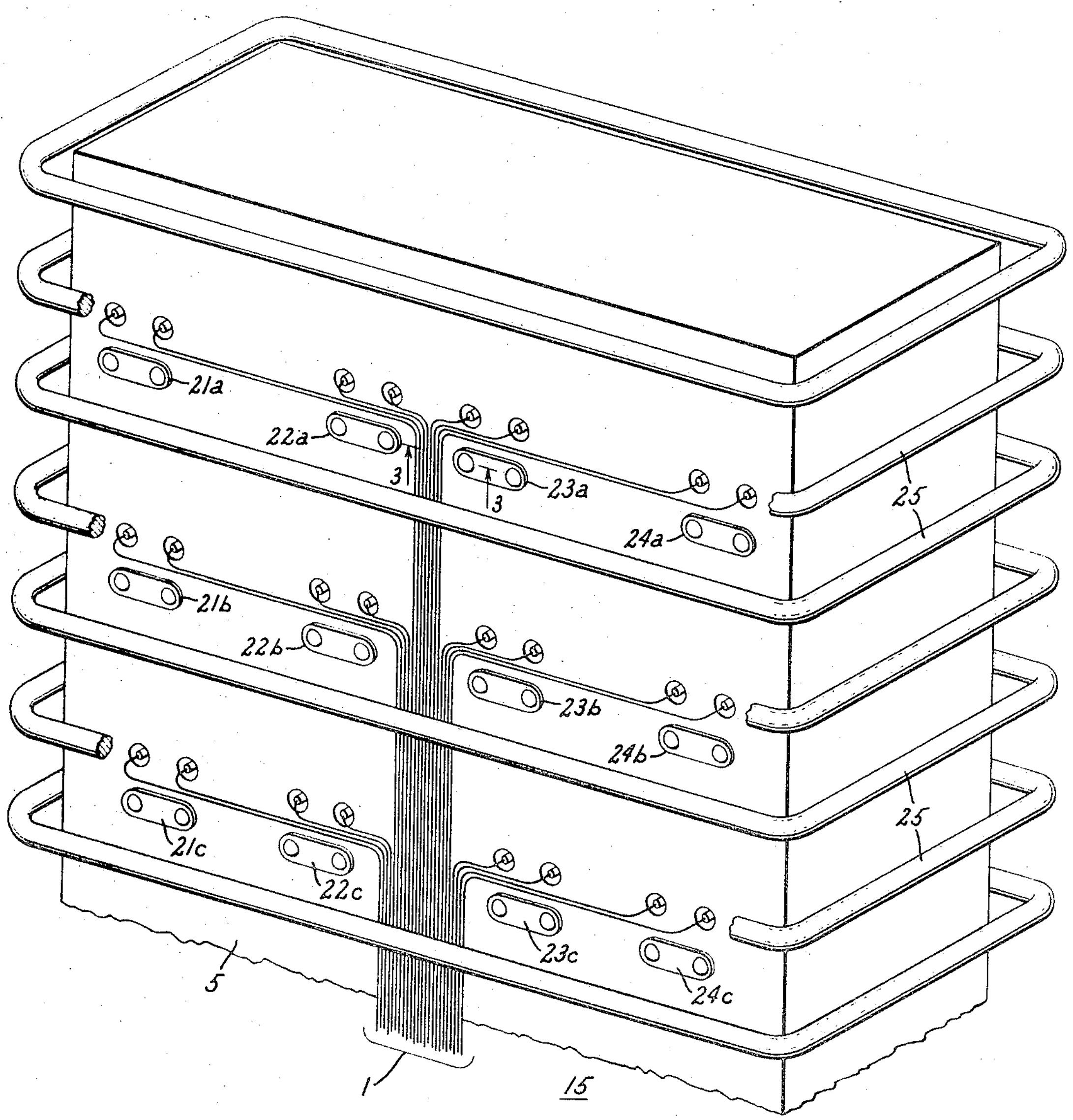
FIG. 2 is a partial view in perspective of a housing of insulating material with a plurality of light pipes supported on its exterior surface.

The previously described coating 11 is preferably applied not only to the light pipe 1 but also to the insulating structure that supports this pipe. This is illustrated in FIGS. 2 and 3. FIG. 2 shows a housing 15 having a sidewall 5 of insulating material. A plurality of light pipes 1 are disposed along the exterior surface of the sidewall 5 to which they are physically connected at spaced intervals by suitable fastening means. The light pipes lead respectively to an equal plurality of light sensitive elements (see reference No. 4 in FIG. 1) behind the enclosure 5, and these elements are respectively associated with circuits (reference No. 8 in FIG. 1) at various different potentials. Suitable means, including the external conductors **21*a*, 21*b*, 21*c*, 22*a*, 22*b*, 22*c*, 23*a*, 23*b*, 23*c*, and 24*a*, 24*b*, 24*c* are provided for electrically interconnecting the respective circuits inside the housing 15. The potentials of the conductors 21*a*, 22*a*, 23*a*, and 24*a* near the top of the housing 15 are very high with respect to ground. The housing 15 is surrounded by a series of corona rings 25**.

In this embodiment of my invention, as is best seen in FIG. 3, the coating 11 is brushed or sprayed on the surface of the light pipes and the supporting structure so as to form a continuous coating whose thickness is relatively constant. Thus the coating 11 not only covers the surface of the light pipes but also extends across the enclosure surface and intimately contacts the various circuit-interconnecting conductors (**23*a* in FIG. 3**). In a known manner, this extended coating aids in maintaining an even distribution of the electric field about the enclosure. It is particularly advantageous for my purposes because it ensures a relatively uniform gradient between the adjacent fastening means which are used to connect the light pipes to the enclosure wall, and because it also grades the potential transversely to the direction in which the light pipes run.

As will be evident from the foregoing description, certain aspects of the invention are not limited to the particular details of the construction of examples illustrated, and it is contemplated that various other modifications or applications will occur to those skilled in the art. It is therefore intended that the appended claims shall cover such modifications and applications as do not depart from the true spirit and scope of my invention.

I claim:

1. Apparatus for transmitting light energy between devices of different electrical potentials comprising: an insulating enclosure having an exterior surface, a plurality of spaced-apart conductors disposed on said surface and having different electrical potentials with respect to one another, a light conduit supported by said enclosure and extending between devices of different electrical potentials, said conduit being in contact with said exterior surface along an appreciable portion of its length, and a coating having substantially homogeneous resistive characteristics covering said conduit and all parts of said surface between said conductors and said conduit, said coating being in contact with said conductors and extending to said devices to form a continuous surface of substantially homogeneous resistive characteristics therebetween, whereby a substantially uniform voltage gradient along said conduit is obtained.

* * * * *